Nov. 15, 1966 — W. A. BOOTHE — 3,285,264
FLUID-OPERATED DETECTORS
Filed March 31, 1964 — 4 Sheets-Sheet 1
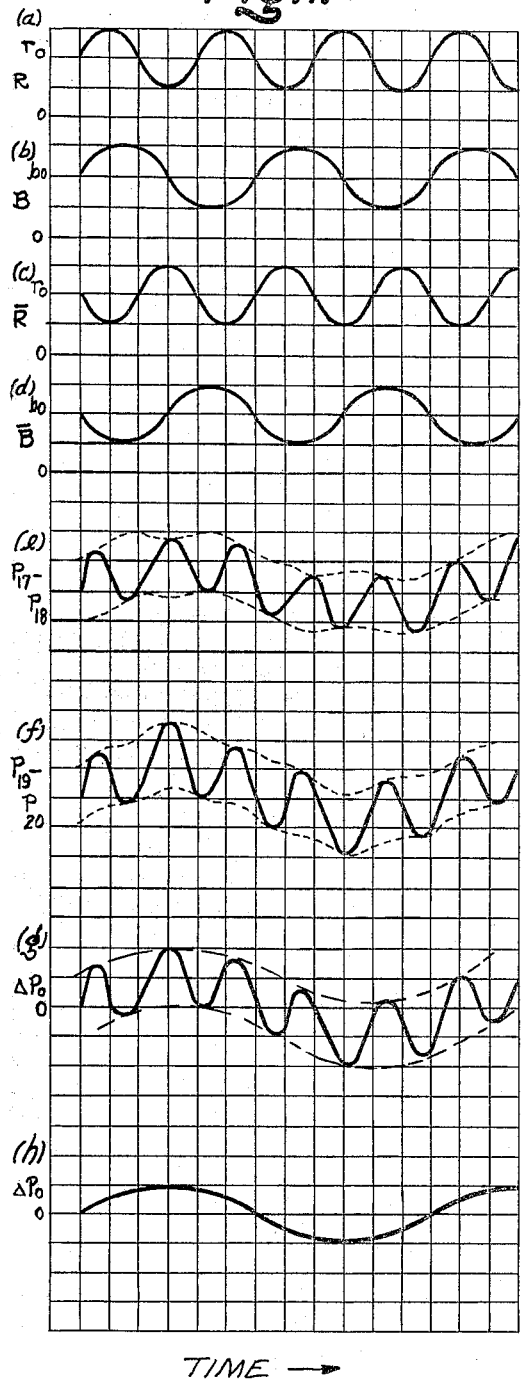
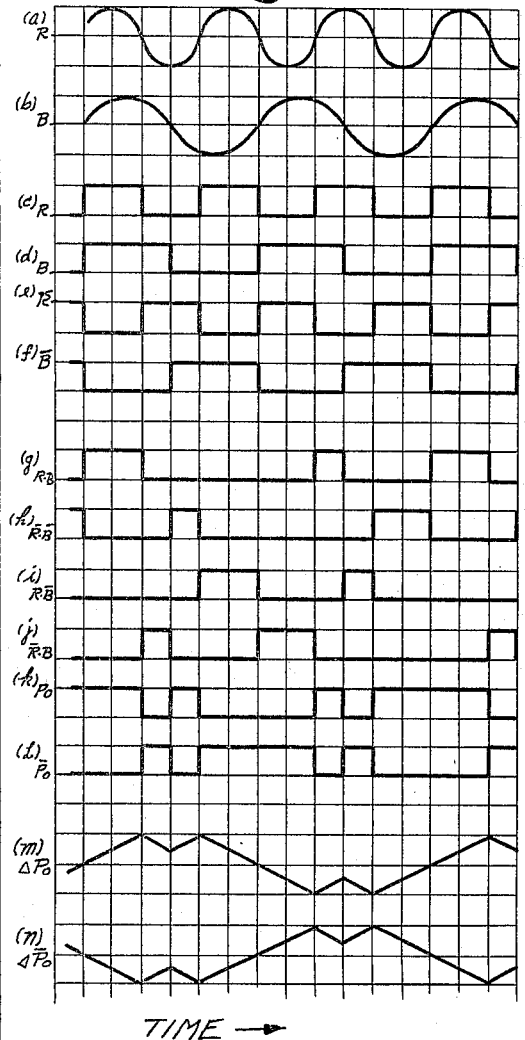
Inventor:
Willis A. Boothe
by Paul A. Frank
His Attorney Nov. 15, 1966 — W. A. BOOTHE — 3,285,264
FLUID-OPERATED DETECTORS
Filed March 31, 1964 — 4 Sheets-Sheet 2
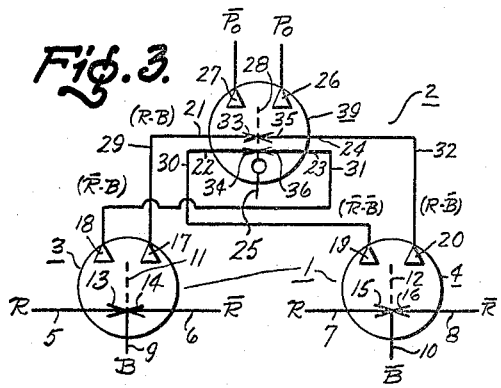
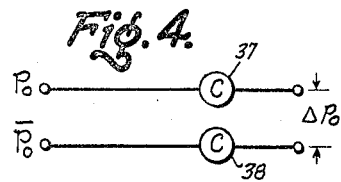
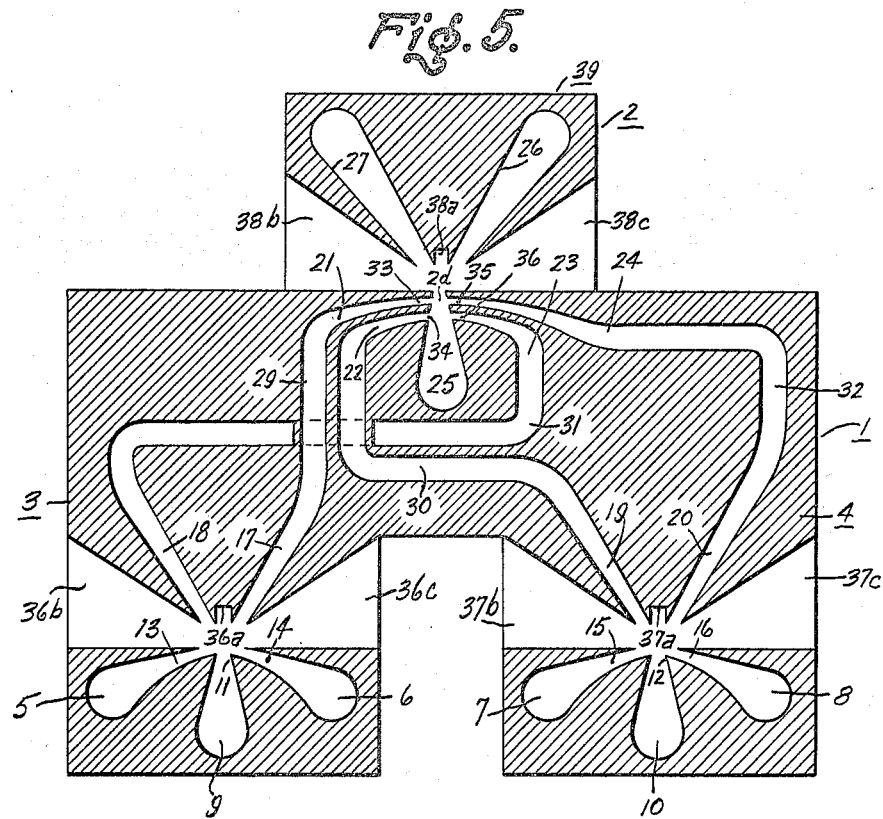
Inventor:
Willis A. Boothe,
by Paul A. Frank
His Attorney Nov. 15, 1966 W. A. BOOTHE 3,285,264
FLUID-OPERATED DETECTORS
Filed March 31, 1964 4 Sheets-Sheet 3
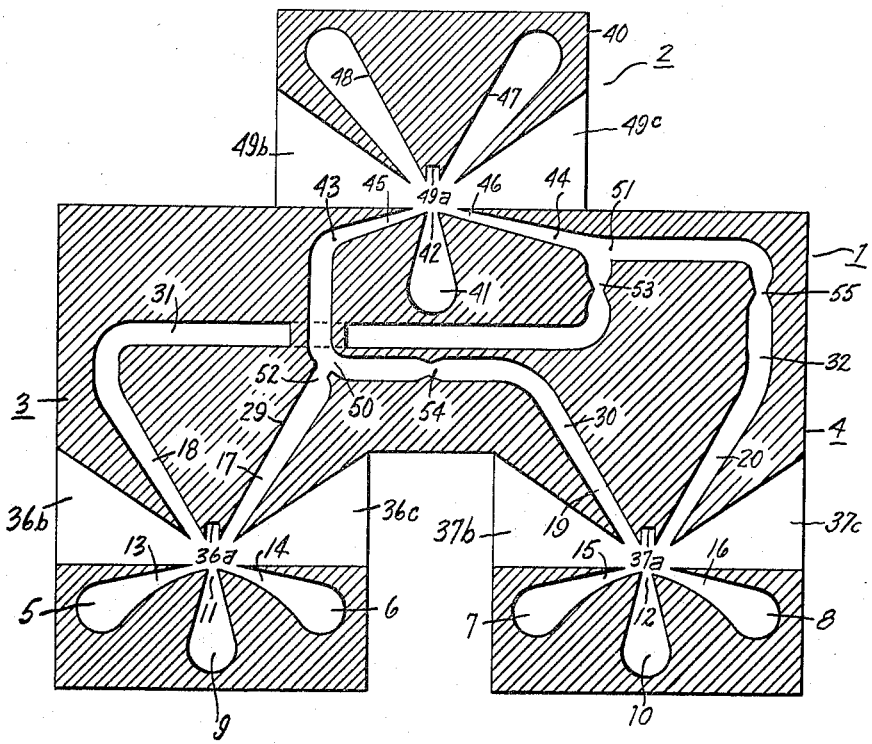
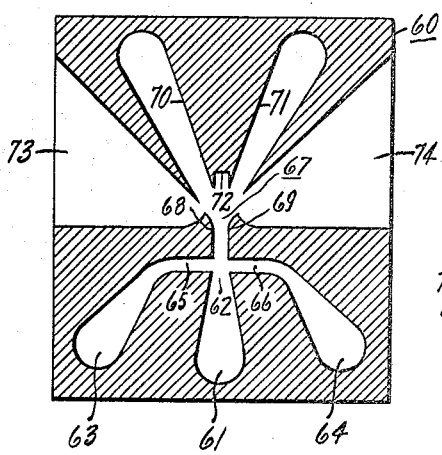
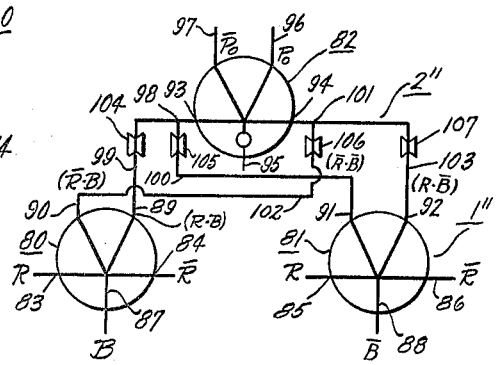
Inventor:
Willis A. Boothe
by Paul A. Frank
His Attorney.

Nov. 15, 1966   W. A. BOOTHE   3,285,264
FLUID-OPERATED DETECTORS
Filed March 31, 1964   4 Sheets-Sheet 4
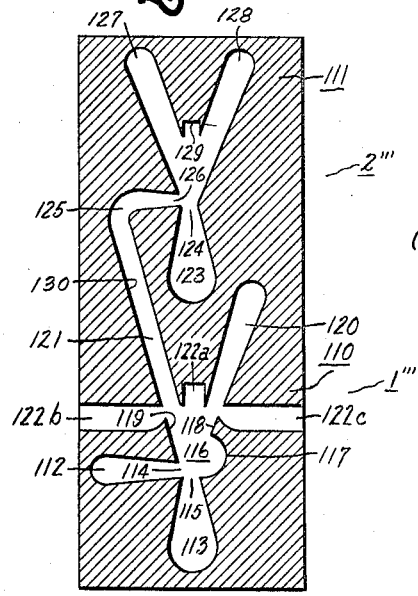
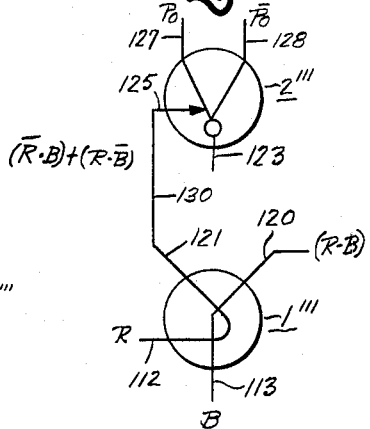
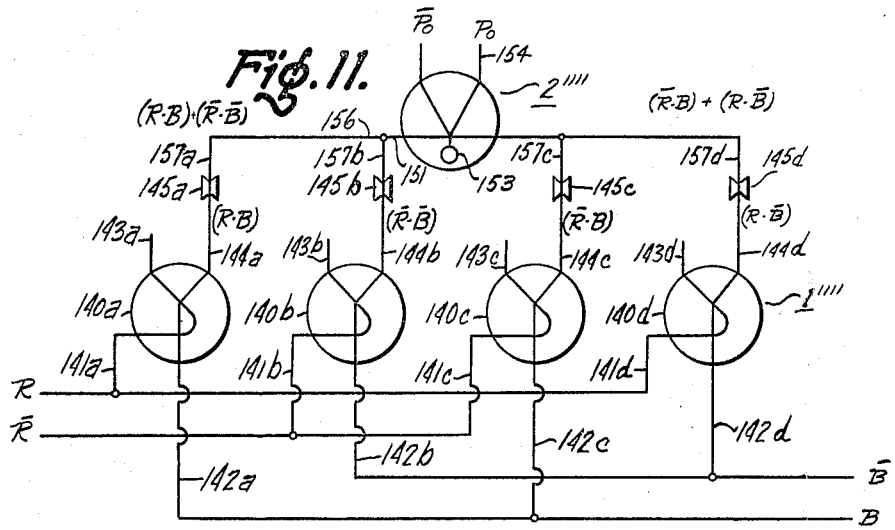
Inventor:
Willis A. Boothe
by Paul A. Frank
His Attorney United States Patent Office 3,285,264
Patented Nov. 15, 1966

3,285,264
FLUID-OPERATED DETECTORS
Willis A. Boothe, Scotia, N.Y., assignor to General Electric Company, a corporation of New York
Filed Mar. 31, 1964, Ser. No. 356,103
18 Claims. (Cl. 137—81.5)

This invention relates to beat frequency detectors and, more particularly, to fluid-operated beat frequency detectors comprising circuit arrangements of fluid control devices for heterodyning input fluid waves to produce beat frequency output fluid waves.

Fluid control devices feature inherent reliability and an essentially unlimited life-span since generally they employ neither mechanical moving parts, thereby avoiding frictional wear, nor parts undergoing self-deterioration or dissipation in operation, thereby avoiding a limited life-span such as that experienced in an electron tube due to cathode deterioration. Further, they can be produced at low cost due to their ease of fabrication from virtually any material that is nonporous and has structural rigidity. In addition, the devices may be connected in circuit relationship either by appropriate interconnection of individual devices or by the formation of the devices in interconnected fashion directly in a single piece of material. Fluid control devices are particularly ideal for applications wherein conditions of nuclear radiation, high temperature, vibration, and mechanical shock may be present since electronic systems operate imperfectly, if at all, under such conditions.

Two of the basic types of fluid control devices are generally referred to as the analog, or momentum exchange type, and the digital, or boundary layer effect type. In both of these types of fluid control devices, power fluid is received through a power fluid inlet and formed into a power jet. Similarly, control fluid is received through control fluid inlets and formed into control jets directed against one or opposite sides of the power jet for deflecting the power jet selectively for reception within one or the other of two fluid receivers. Each of the receivers is formed as an integral portion of a power flow passage, the latter communicating with an associated power fluid outlet on the device. The same or different types of fluid may be employed as the control fluid and the power fluid, the fluids including both compressible fluids, such as gas and air, and relatively incompressible fluids, such as water and oil.

In an analog fluid control device, frequently called an analog fluid amplifier, the power jet is directed normally midway between two receivers. By selectively increasing the flow of control fluid to one of the control fluid inlets relative to the other, the output level of the associated control jet is increased relative to the other, causing a deflection of the power jet in a proportional amount from its normally centralized position into the associated one of the receivers. The increase in the output flow of power fluid from the power fluid outlet communicating with the associated one of the receivers is thus proportional to the increase in the control fluid flow, and the device is said to operate in an analog manner.

In a digital fluid control device, frequently called a digital fluid amplifier, there are provided oppositely disposed side walls defining an interaction chamber through which the power jet passes, the side walls diverging one from the other in the direction of fluid flow in the power jet. The side walls are designed to create an entrainment action with the power jet, the entrainment action comprising the trapping of fluid in the regions between each side of the power jet and the adjacent side wall. The trapping of fluid reduces the pressure in the regions, creating pressure forces on the power jet tending to deflect it toward one or the other of the side walls. Even in the absence of a control jet, turbulence effects in the power jet create an unbalanced condition in the forces acting thereon, causing the power jet to approach one or the other, but not both, of the side walls. The more closely the power jet approaches one of the side walls, the lower the pressure becomes in the region of the trapped fluid, whereby the imbalance in the forces increases and the power jet is more strongly attracted to the given one of the side walls. The regenerative effect causes the power jet to rapidly assume a stable state of deflection in which it is attached to one of the side walls for a substantial distance along the length thereof, substantially all of the power fluid flowing into the receiver associated with that side wall.

The power jet remains attached to one or the other of the side walls in this manner, independently of control jet action if the amplifier is designed to have memory. To deflect the power jet, for initiating attachment to the opposite side wall, the output level of the control jet which is directed against the side of the power jet attached to one of the side walls is increased relative to the output level of the other control jet in an amount sufficient to introduce control fluid into the low pressure region of trapped fluid. The control fluid thus introduced increases the pressure in the region of the trapped fluid, thereby decreasing the effects of the entrainment action and progressively detaching the power jet from the side wall. The control jet continues to be directed against the power jet deflecting the power jet toward the other, or opposite, side wall. In an identical fashion, the power jet experiences an entrainment action with the opposite side wall and becomes attached thereto, the receiver associated with the opposite side wall receiving the flow of power fluid from the power jet. The flow of power fluid in the digital fluid control device therefore responds to the input control fluid in a digital fashion, providing, to a substantial degree, the exclusive presence or absence of a power fluid flow at one or the other of the receivers, and therefore at the one or the other of the power fluid outlets respectively communicating therewith. Due to the entrainment action, that is, a boundary layer effect, the above-described digital fluid amplifier has a memory function, if the control fluid inlets are sufficiently restricted. If not sufficiently restricted, a control jet must be maintained to keep the power jet deflected or else it becomes unstable. Memory action is not necessary in any of the fluid amplifier circuits hereinafter described.

Digital fluid control devices operating on the boundary layer effect, therefore, are bistable devices, providing substantially mutually exclusive flows of power fluid maintained in a stable state at either one or the other of the power fluid outlets thereof.

Inasmuch as the term "digital" refers to the mutually exclusive flows of power fluid, it should be appreciated that fluid control devices may also be constructed which do not employ the boundary layer effect but, nevertheless, constitute digital fluid control devices. Illustratively, such a digital fluid control device may be monostable in operation, the power jet normally maintaining a stable state of deflection for creating a substantially exclusive flow of power fluid at a second power fluid outlet, whereby the output fluid waves will likewise be digital in character and have a substantially square waveform.

By appropriate techniques, fluid control devices may be fabricated in a manner to perform various logic functions. Illustratively, both an "exclusive OR" function and an "AND" function may be performed by a "half-adder" fluid control device in which first and second fluid waves are received at first and second fluid inlets. The first and second fluid waves are formed into first and second fluid jets, respectively, which, independently and exclusively of each other, proceed in the absence of the other to be received in a first receiver. The concurrent presence of both jets, however, effects a mutual interaction causing a joint deflection of the two jets for reception within a second receiver. The half-adder device, therefore provides an exclusive OR function indicated by a flow of power fluid at a first power fluid outlet which communicates with the first receiver and an AND function indicated by the flow of power fluid at a second power fluid outlet which communicates with the second receiver.

In addition to employing appropriate techniques for fabricating fluid control devices capable of performing certain specified functions, such as illustrated by the half-adder device, the basic fluid control devices may be employed independently, or may be connected in circuit relationship, to provide desired operative or logic functions. Illustratively, both the analog and the digital fluid control devices perform amplification, the deflection of the power jets being effected by relatively low power level control jets in response to the input fluid waves to form output fluid waves of increased power level. Addition of two input waves may be accomplished by forming each input fluid wave into a control jet, and directing both of the control jets against one given side of the power jet, thereby jointly effecting a deflection of the power jet toward one of the receivers; alternatively, the input fluid waves may be combined to form a single control jet for deflection of the power jet to perform the addition. Conversely, subtraction of two input fluid waves may be accomplished by forming each input fluid wave into a control jet and directing the control jets against opposite sides of the power jet, the net deflection of the power jet being a function of the difference in the relative output levels of the control jets. Further, to perform multiplication, both the control and the power jets may be controlled in response to first and second input waves, respectively, the output fluid waves representing the multiplied value thereof. Thus, the operative terms of an algebraic equation may be simulated by fluid control devices, and the devices may be appropriately interconnected for solving the equation in accordance with any desired input values.

These various features of fluid control devices are incorporated in the circuits as shown and described herein to provide fluid-operated beat frequency detectors of highly simplified design and operation but of low cost and high reliability in operation. The beat frequency detector may be used in error sensing circuits and can also be used as a frequency reducer by shifting a frequency a fixed amount.

Therefore, it is an object of this invention to provide a beat frequency detector employing a fluid as the operating medium.

Another object of this invention is to provide a beat frequency detector employing no electrical parts nor any moving mechanical parts but rather employing a fluid as both the power conducting medium and the controlling medium.

It is a further object of this invention to provide a fluid-operated beat frequency detector employing fluid control devices connected in circuit for heterodyning two input fluid waves of different frequencies and generating an output fluid wave including as frequency components the sum-frequency and difference-frequency of the two input fluid waves.

A further object of this invention is to provide a fluid-operated beat frequency detector of low cost in construction, of simplified design, and of high reliability and long life in use.

Further objects and advantages of this invention will become apparent as the following description proceeds and the features of novelty of the invention will be pointed out with particularity in the claims annexed to and forming a part of this application.

In accordance with the present invention, there is provided a fluid control system comprising first and second stages of fluid control devices, each providing a controlled flow of power fluid. The stages are connected in circuit relationship according to a predetermined logic function, the second stage receiving as a flow of control fluid the controlled flow of power fluid from the first stage. The fluid control system further includes inlet means which communicate with the first stage and outlet means which communicate with the second stage, first means and second means being provided for applying to the inlet means, respectively, a first input fluid wave of a first frequency and a second input fluid wave of a second frequency. The first stage, which may comprise one or more fluid control devices selectively of the analog, the digital, or the half-adder variety, provides interaction of the first and the second input fluid waves to generate a flow of power fluid controlled in accordance with the concurrent presence of predetermined characteristics in the first and second input fluid waves. The flow of power fluid is controlled in the second stage in response to the flow of control fluid received therein, and thus in response to the controlled flow of power fluid in the first stage. The output fluid waves created at the outlet means of the fluid control system comprise the flows of power fluid from the second stage and thus comprise complementary or push-pull fluid waves having as frequency components the sum-frequency and difference-frequency of the input fluid waves.

For a better understanding of the invention, reference may be had to the following description and drawings in which:

FIGURES 1 (a–h) comprise wave forms (fluid pressure versus time) of fluid waves existing at various points in the analog embodiments of the fluid-operated beat frequency detectors of the invention;

FIGURES 2 (a–n) comprise wave forms of fluid waves existing at various points in the digital embodiments of the fluid-operated beat frequency detectors of the invention;

FIGURE 3 is a schematic of a first embodiment of the fluid-operated beat frequency detector of the invention;

FIGURE 4 is a schematic of a fluid wave filter system for use with any of the various embodiments of fluid-operated beat frequency detectors of the invention;

FIGURE 5 is a physical diagrammatic representation of the embodiment of the fluid-operated beat frequency detector shown in schematic form in FIGURE 3;

FIGURE 6 is a physical diagrammatic representation of a second embodiment of the fluid-operated beat frequency detector of the invention;

FIGURE 7 is a physical diagrammatic representation of a digital fluid control device of the boundary layer effect type;

FIGURE 8 is a schematic of a third embodiment of the fluid-operated beat frequency of the invention;

FIGURE 9 is a physical diagrammatic representation of a fourth embodiment of the fluid-operated beat frequency detector of the invention;

FIGURE 10 is a schematic of the embodiment of the invention shown in FIGURE 9; and FIGURE 11 is a schematic of a fifth embodiment of the fluid-operated beat frequency detector of the invention.

*Basic theory*

To facilitate an understanding of the operation of the fluid beat frequency detectors of the invention, it should be understood that heterodyning, such as is achieved in a beat frequency detector, comprises the mixing of two input signals having different frequencies in a nonlinear device. A beat frequency detector generates, as an output, a signal having as frequency components the sum-frequency and difference-frequency of the input signals, either or both of which frequency components may be selected by proper tuning or filtering of the output signal. In relation to fluid systems, the input signals comprise fluid waves having pressure variations representative of the frequency information, the fluid waves normally having a bias, or pressure reference, level on which the frequency information is superimposed. The input signals may be alternating variations or square wave in nature.

For ease of representation of the fluid waves, the first and second input fluid waves will be indicated, respectively, by the symbols R and B. It is to be understood that the parameters of the fluid waves shown in FIGURES 1 and 2 are fluid pressure versus time. The waves R and B are represented, respectively, in FIGURES 1(a) and 1(b) as sinusoidal in nature and being superimposed on steady state reference pressures $r_0$ and $b_0$, respectively; however, as indicated in FIGURES 2(c) and (d), the input waves R and B may be square waves, or may be operative as square waves due to the inherent operating characteristics of the fluid control devices to which the sine waves R and B of FIGURES 2(a) and 2(b), respectively, are applied. In the following discussion, it will be assumed that the sinusoidal waves of FIGURES 1(a-h) and the square waves of FIGURES 2(c-n) refer, respectively, to analog and digital fluid control systems. In accordance with standard logic notation, $\bar{R}$ and $\bar{B}$ may indicate either the absence of predetermined characteristics in the waves R and B, respectively, or the complements thereof, complementary waves $\bar{R}$ and $\bar{B}$ of a sinusoidal wave form being shown in FIGURES 1(c) and 1(d), respectively, and of a square wave form being shown in FIGURES 2(e) and 2(f), respectively.

From the foregoing discussion of the operation of fluid control devices, it is apparent that there are inherently two power fluid outlets in each such device, the deflection of the power jet creating in push-pull fashion, at the power fluid outlets, complementary flows of power fluid. Therefore, there will be produced at the outlet means of the fluid control system of the invention an output fluid wave, $P_0$, and its complement $\bar{P}_0$. In addition to the above notations, $\Delta P_0$ will be employed to represent the pressure differential existing between the two output fluid waves, $P_0$ and $\bar{P}_0$.

The heterodyning effected in the fluid-operated beat frequency detectors of the invention may be expressed by basic relay logic in accordance with the above notations by the following equations:

$$P_0 = (R \cdot B) + (\bar{R} \cdot \bar{B}) \qquad (1)$$
$$\bar{P}_0 = (R \cdot \bar{B}) + (\bar{R} \cdot B) \qquad (2)$$

In the above equations, the dot sign (·) indicates the logis AND function, and the plus sign (+) indicates the logic OR function, the parenthetical grouping of the AND functions of R, B, $\bar{R}$ and $\bar{B}$ indicating the nondistributive character of the logic functions indicated in the equations. The parenthetically grouped AND functions are hereinafter referred to as the terms of Equations 1 and 2. The input fluid waves R and B, or the complements $\bar{R}$ and $\bar{B}$ thereof, are selectively applied to the input means of the first stage. The mixing of these input waves in the first stage of digital fluid amplifiers provides an output flow of power fluid therefrom comprising, in logic notation, the terms of one or both of the Equations 1 and 2. The wave forms of the output power flows from the first stage are indicated in FIGURES 2 (g-j) for a digital system, each of the wave forms in the figures being appropriately labeled with the identifying logic term. The wave forms of the push-pull output power flows from the first stage are indicated in FIGURES 1(e, f) for an analog system.

The output flow of power fluid from the first stage is applied to the second stage as an input flow of control fluid therein, the connection of the first and second stages being in accordance with a predetermined logic function for implementing, in the second stage, the logic OR function of Equations 1 and 2. Thus, there will be generated at the power fluid outlets of the second stage flows of power fluid comprising the push-pull or complementary output fluid waves $P_0$ and $\bar{P}_0$, in accordance with Equations 1 and 2. The output fluid waves $P_0$ and $\bar{P}_0$ are represented in FIGURES 2 (k and l) for a digital fluid system. The pressure differential between the output fluid waves $P_0$ and $\bar{P}_0$ therefore will constitute a push-pull fluid wave having as frequency components the sum-frequency and the difference-frequency of the input fluid waves R and B. By appropriate filtering techniques, the sum frequency component of the push-pull output fluid wave may be removed by filtering to provide an output fluid wave $\Delta P_0$ having as a frequency component only the difference frequency of the input fluid waves R and B, the filtered output wave $\Delta P_0$ being indicated in FIGURE 1(h) for an analog system and in FIGURE 2(m) for a digital system. Clearly, there may also be derived the complementary filtered output wave $\Delta \bar{P}_0$, the wave form of which is shown in FIGURE 2(n) for a digital system. The unfiltered output fluid wave $\Delta P_0$ for an analog system is indicated in FIGURE 1(g).

In the foregoing discussion, logic notation has been adopted for explaining the operation of the beat frequency detectors of the invention in accordance with Equations 1 and 2. However, it should be appreciated that the various fluid flows may be expressed by the more classical sine and cosine functions where the input fluid waves are sinusoidal in nature and the fluid control system responds in an analog fashion. Again adopting R and B to indicate the first and second input fluid waves, as shown in FIGURES 1(a) and (b), respectively, (a) $R = r \cos W_1 t + r_0$ \qquad (b) $\bar{R} = -r \cos W_1 t + r_0$ \qquad (3)
(b) $B = b \cos W_2 t + b_0$ \qquad (b) $\bar{B} = b \cos W_2 t + b_0$ \qquad (4)

where $W_1$ is the frequency of R and its complement $\bar{R}$; $W_2$ is the frequency of B and its complement $\bar{B}$; and $r_0$ and $b_0$ are the steady state components of R and B, respectively. It may be shown that:

$$P_{17} - P_{18} = 2K_1 r \cos W_1 t [b \cos W_2 t + b_0] \qquad (5)$$
$$P_{19} - P_{20} = 2K_1 r \cos W_1 t [b \cos W_2 t - b_0] \qquad (6)$$
$$P_0 - \bar{P}_0 = \Delta P_0 = 4K_2 r b \cos W_1 t \cos W_2 t$$
$$= 2K_2 r b [\cos(W_1 + W_2) t + \cos(W_1 - W_2) t] \qquad (7)$$

where $P_{17} - P_{18}$ and $P_{19} - P_{20}$ are the push-pull output power flows of the first stage analog type amplifiers 3 and 4, respectively, as illustrated in FIGURES 3, 5, and 6. Constant $K_1$ and $K_2$ are constants of proportionality representing the fluid amplifier gain of one and both stages, respectively. Equation 7 clearly indicates that the push-pull output includes as frequency components the sum-frequency ($W_1 + W_2$) and the difference-frequency ($W_1 + W_2$) of the input fluid waves, R and B.

*Circuit embodiments*

The fluid-operated beat frequency detector shown in schematic form in FIGURE 3 comprises a fluid control system, including a first stage designated as a whole by numeral 1 and a second stage 2 of fluid control devices connected in circuit relationship. Stage 1 includes analog fluid control devices 3 and 4 and stage 2 includes analog fluid control device 39. The fluid control system is provided with first inlet means, comprising control fluid inlets 5 and 6 on the analog fluid control device 3 and control fluid inlets 7 and 8 on the analog fluid control device 4, and second inlet means, comprising power fluid inlets 9 and 10 on the analog fluid control devices 3 and 4, respectively. A first input fluid wave R is applied to the control fluid inlets 5 and 7 and the complementary wave $\bar{R}$ is applied to the control fluid inlets 6 and 8. A second input fluid wave B and the complementary wave $\bar{B}$ are applied, respectively, to the power fluid inlets 9 and 10 of the fluid control devices 3 and 4.

The flows of power fluid comprising the second input fluid wave B and its complement B̄ are formed into power jets indicated by the dotted lines 11 and 12, respectively, in the fluid control devices 3 and 4. The first input fluid wave R and its complement R̄ are formed into control jets indicated by the arrows 13 and 14, respectively, in the fluid control device 3 and by the arrows 15 and 16, respectively, in the fluid control device 4, the control jets 13 and 14 being directed against opposite sides of the power jet 11, and the control jets 15 and 16 being directed against opposite sides of the power jet 12. First and second power fluid oulets 17 and 18 are provided in the fluid control device 3 and act as receivers for receiving the flow of power fluid from the power jet 11. Similarly, first and second power fluid outlets 19 and 20 are provided in the fluid control control device 4 and act as receivers for receiving the flow of power fluid from the power jet 12.

In accordance with the foregoing description of operation of analog fluid control devices, it will be appreciated that the concurrent presence of the predetermined characteristic, defined to be a positive cyclic portion, in each of the input fluid waves R and B will produce, in the fluid control device 3, a control jet 13 and a power jet 11. Control jet 13 will deflect power jet 11, thereby creating a flow of power fluid at the first power fluid outlet 17. Alternatively, the concurrent presence of the same predetermined characteristic in the input waves R̄ and B̄ will produce, respectively, a control jet 14 and a power jet 11. Control jet 14 will deflect power jet 11, thereby creating a flow of power fluid at the second power fluid outlet 18. In accordance with the logic notation hereinbefore set forth (equations 1 and 2), the flow of power fluid at power fluid outlet 17 is represented by the term (R·B); similarly, the flow of power flow at power fluid outlet 18 is represented by the term (R̄·B̄), it being understood that such logic notation is only applicable for square wave input fluid flows. In like fashion, fluid control device 4 will respond to the concurrent presence of the previously defined predetermined characteristic in the input fluid waves R̄ and B̄ to produce a flow of power fluid at power fluid outlet 19 represented by the term (R̄·B̄), and in the input fluid waves R and B̄ to produce a flow of power fluid at power fluid outlet 20 represented by the term (R̄·B̄). The output fluid waves from the fluid control devices 3 and 4 of stage 1 will be recognized, by their logic notation, to provide the various terms of equations 1 and 2.

The AND function indicated in the terms (R̄·B), (R·B), (R̄·B̄), and (R·B̄) representing the output power flows from stage 1 is applicable only for the case of square wave input fluid flows. The analog amplifiers of the present invention are operable with either sinusoidal or square wave inputs. For the case of sinusoidal fluid wave inputs, the push-pull output power from stage 1 is that represented in FIGURES 1 (e, f) wherein FIGURE 1 (e) represents the push-pull output $P_{17}$–$P_{18}$ of amplifier 3 and FIGURE 1(f) represents the push-pull output $P_{19}$–$P_{20}$ of amplifier 4. It should be noted that the high frequency or carrier frequency component shown in FIGURES 1(e) and 1(f) represents the sum-frequency ($W_1+W_2$) and the low frequency or modulating frequency component represents the difference-frequency ($W_1-W_2$) of the input fluid waves R and B. The waves of FIGURES 1(e) and 1(f) also contain a component of frequency $W_2$.

Stage 2 comprises an analog fluid control device 39 having control fluid inlets 21–24, a power fluid inlet 25, and first and second power fluid outlets 26 and 27. The flow of power fluid received in power fluid inlet 25 is formed into a power jet indicated by the dotted line 28. The control fluid inlets 21 and 22 of the fluid control device 39 of stage 2 communicate with the first power fluid outlets 17 and 19 of the fluid control devices 3 and 4 of stage 1 through conduits 29 and 30, respectively. Similarily, the control fluid inlets 23 and 24 communicate with the second power fluid outlets 18 and 20 of the fluid control devices 3 and 4 through conduits 31 and 32, respectively.

The flow of power fluid from stage 1, represented by the terms (R·) and (R̄·B̄) is received in stage 2 through the conduits 29 and 30 as a flow of control fluid at the control fluid inlets 21 and 22 of fluid control device 39. In an identical fashion, the flow of power fluid from stage 1, represented by the terms (R̄·B) and (R·B̄), is received through the conduits 31 and 32 in stage 2 as a flow of control fluid at the control fluid inlets 23 and 24 of the fluid control device 39. The control fluid flows (R·B) and (R̄·B̄) are formed respectively, into the control jets represented by the arrows 33 and 34, and directed against one side of the power jet 21. Similarly, the control fluid flows (R·B̄) and (R̄·B are formed into control jets represented by the arrows 35 and 36 and directed against the opposite side of the power jet 28. Any given one of the control jets 33 and 36 is sufficient for effecting a deflection of the power jet 28 from its normally centralized position to create a flow of power fluid at one or the other of the power fluid outlets 26 and 27. Thus, there will be produced at power fluid outlet 26 a flow of power fluid in response to control jets represented by either the term (R·B) or the term (R̄·B̄). Similarly, there will be produced at power fluid outlet 27 a flow of power fluid in response to control jets represented by either term (R̄·B) or the term (R·B̄).

It will be apparent that the first and second flows of power fluid created, respectively, at the first and second power fluid outlets 26 and 27 may be expressed in logic notation in accordance with equations 1 and 2, respectively, as hereinbefore set forth for the case of square wave input fluid flows. The first and second power fluid outlets 26 and 27 comprise the outlet means of the fluid control system, and thus the flows of power fluid thereat comprise, respectively, the first and second output fluid waves $P_0$ and $\overline{P}_0$. For the case of sinusoidal input fluid flows, the unfiltered push-pull output between outlets 26 and 27, $\Delta P_0$, is shown in FIGURE 1(g) and clearly indicates the presence of the sum-frequency and difference-frequency of the input fluid waves R and B, the $W_2$ component having been eliminated.

As represented schematically in FIGURE 4, the output fluid waves $P_0$ and $\overline{P}_0$ for the square wave input case, and the push-pull output $\Delta P_0$ for the sinusoidal case may be passed through fluid filters, or occumulators 37 and 38, for removing therefrom the high frequency component constituting the sum-frequency of the input fluid waves R and B. Following the filtering, the output fluid wave $\Delta P_0$ is represented by the approximately sinusoidal wave form shown in FIGURE 1(h), the frequency components thereof being equal to the difference-frequency of the input fluid waves R and B. Any distortions in the push-pull output wave $\Delta P_0$ shown in FIGURE 1(h) arises from the substantial difference in the frequencies of the input waves R and B which have been shown in a frequency ratio of 3 to 2 for purposes of clarity in illustrating the various wave forms shown in FIGURES 1 and 2. In actual practice, however, the input waves R and B will be more nearly equal in frequency whereby the shape of the wave form of $\Delta P_0$ will be smoother and will approach more nearly a pure sine wave.

In FIGURE 5 there is shown a diagrammatic physical representation of the beat frequency detector shown in schematic form in FIGURE 3. As noted hereinbefore, the base material is selected to be nonporous and to have structural rigidity and may comprise a single flat plate or plurality of superposed flat laminations. Any of various metals and plastics may therefore be employed, the choice, in part, being determined by the environment to which the system will be subjected. The paths through which the fluid passes are defined in the base as channels or grooves formed by suitable cutting or grooving techniques or, alternatively, by corresponding dies or forms in a molding process. The region of the base surrounding, and therefore defining, the grooves is shown in cross-hatched manner and provides a flat surface on which a top plate (not shown) may be positioned and secured thereto for enclosing the grooves. In this manner, the channels are isolated from the ambient atmosphere and the fluid is contained therein. In practice, it often may be desirable to employ a transparent top plate to allow inspection of the interior of the system, whereby the assembled structure will have an appearance closely resembling that of FIGURE 5. Also, as hereinbefore noted, the fluid control devices which constitute the composite system may be formed individually, and appropriately interconnected by tubing or other fluid containing elements. Due to the ease of fabrication, however, it will generally be more convenient and desirable to form the entire system in a single base member in the manner indicated.

Using numerals in FIGURE 5 identical with those used to indicate identical elements in FIGURE 3, in stage 1, the analog fluid control device 3 includes control fluid inlets 5 and 6 terminating respectively in nozzles 13 and 14 for forming control jets; similarly, analog fluid control device 4 includes control fluid inlets 7 and 8 terminating in nozzles 15 and 16, respectively, for forming control fluid jets. In like fashion, fluid control device 3 includes a power fluid inlet 9 terminating in nozzle 11 for forming a power jet and fluid control device 4 includes a power fluid inlet 10 terminating in nozzle 12 for forming a power jet. Fluid control devices 3 and 4 further include first power flow passages 17 and 19 and second power flow passages 18 and 20. The power flow passages 17–20 serve as receivers for receiving the flow of power fluid from their associated power jets and also provide power fluid outlets on the devices 3 and 4.

The fluid control device 39 of stage 2 includes control fluid inlets 21–24 terminating in nozzles 33, 34, 36, 35, respectively, for forming control fluid received therein into control jets. The control fluid inlets 21 and 22 communicate with the first power flow passages 17 and 19 of the fluid control devices 3 and 4 of stage 1, respectively, through conduits 29 and 30 for receiving the flow of power fluid from stage 1 as a flow of control fluid in stage 2. In a similar fashion, control fluid inlets 23 and 24 communicate with the second power flow passages 18 and 20 of the fluid control devices 3 and 4 of stage 1, respectively, through conduits 31 and 32 for receiving the flow of power fluid from stage 1 as a flow of control fluid in stage 2. The fluid control device 39 further includes a power fluid inlet 25 terminating in nozzles 28 for forming a power fluid jet and first and second power flow passages 26 and 27. The latter serve as receivers for receiving the flow of power fluid from power jets 28 and provide the power fluid outlets of the fluid control device 39. Nozzles 33 and 34 form the flow of control fluid received in control fluid inlets 21 and 22, respectively, into control jets directed against one side of the power fluid jet from nozzle 28. Likewise, nozzles 35 and 36 form the flow of control fluid received in control fluid inlets 24 and 23, respectively, into control jets directed against the opposite side of the power jet from nozzle 28.

The fluid control devices 3, 4, and 39 further include, respectively, indentations 36a, 37a, and 38a, located intermediate the associated power flow passages in each device which may be vented, but even if not vented (as shown) will improve operation of the analog type amplifiers. The fluid control devices 3, 4, and 39 also are provided, respectively, with vents 36b and 36c, 37b and 37c, and 38b and 38c which serve to equalize the pressure on the opposite sides of the respectively associated power jets and to remove excess power fluid from the deflection region. Although the indentations and vents are not essential for the operation of the fluid control devices, their use is preferred to obtain improved performance.

IN FIGURE 6 there is indicated a diagrammatic physical representation of a fluid control system operating in substantially identical fashion with the system shown in FIGURES 3 and 5. Stage 1 includes analog fluid control devices 3 and 4 which are identical in all details with the fluid control devices 3 and 4, respectively, of FIGURES 3 and 5. Whereas the fluid control device 39 of stage 2 of FIGURE 5 is of a specialized construction having four control fluid inlets 21–24, the analog fluid control device 40 of stage 2' of FIGURE 6 is identical in construction to the fluid control devices 3 and 4 of stage 1. The analog fluid control device 40 includes a power fluid inlet 41 terminating in a nozzle 42 for forming power fluid received therein into a power jet and first and second control fluid inlets 43 and 44 terminating in nozzles 45 and 46 which form control fluid received therein into control jets directed against opposite sides of the power jet. Power flow passages 47 and 48 act as receivers for receiving the power fluid flow upon deflection of the power jet. Indentation 49a, located intermediate the power flow passages 47 and 48, whether vented or not, improves operation of analog amplifier 40. Vents 49b and 49c serve to oequalize the pressure on the sides of the power jet and provide passageways for removing excess fluid from the deflection region.

The T-junction 50 connects control fluid inlet 43 of the fluid control device 40 with the conduits 29 and 30 for combining the flows of power fluid therein from the first power flow passages 17 and 19 of the devices 3 and 4, respectively, as a single flow of control fluid at the first control fluid inlet 43. Similarly, T-junction 51 connects control fluid inlet 44 of the fluid control device 40 with the conduits 31 and 32 for combining the flows of power fluid therein from the second power flow passages 18 and 20 of the devices 3 and 4, respectively, as a single flow of control fluid at the second control fluid inlet 44. Thus, through the use of T-junctions 50 and 51 and the restrictors 52–55, the fluid control device 40 requires only the two control fluid inlets 43 and 44, and thus permits its construction in an identical fashion to the fluid control devices 3 and 4. Restrictors 52–55 are provided in the conduits 29, 31, 30, 32, respectively, to prevent the creation of deleterious back pressure effects otherwise existing upon the flow of power fluid in one, but not the other, of the two conduits having a common connection at the T-junctions 50 and 51.

The operation of the beat frequency detector of FIGURE 6 is essentially identical to that of the beat frequency detector shown in FIGURES 3 and 5. A flow of control fluid is received in control fluid inlet 43 of stage 2' in response to a flow of power fluid from stage 1 in accordance with either of the logic notations (R·B) or ($\bar{R}·\bar{B}$) and in control fluid inlet 44 of stage 2' in response to a flow of power fluid from stage 1 in accordance with either of the notations ($\bar{R}·B$) or (R·$\bar{B}$). As previously stated, the logic notation herein employed refers only to the case of square wave input fluid flows, and its use for sinusoidal input flows is merely a means to identify particular output fluid flows in each of the analog fluid amplifiers. The control jets formed at nozzles 45 and 46 of the control fluid inlets 43 and 44, respectively, will therefore deflect the power jet issuing from nozzle 42 to create a flow of power fluid in power flow passage 47 in accordance with the logic function (R·B)+($\bar{R}·\bar{B}$) and in power flow passage 48 in accordance with the logic function ($\bar{R}·B$)+(R·$\bar{B}$). Power flow passages 47 and 48 provide both the power fluid outlets of fluid control device 40 and the outlet means of the fluid control system, whereby the flows of power fluid from power flow passages 47 and 48 comprise, respectively, the output fluid waves $P_0$ and $\overline{P}_0$ in accordance with Equations 1 and 2. Inasmuch as the fluid control devices 3, 4, and 40 are all of the analog variety, it is apparent that the system may also be analyzed in accordance with the classical sine wave analysis indicated in Equations 3–5.

In FIGURE 7 there is shown a diagrammatical physical representation of a digital fluid control device 60. There is provided a power fluid inlet 61 terminating in nozzle 6 for forming a power fluid jet. Control fluid inlets 63 and 64, terminating in nozzles 65 and 66, respectively, receive control fluid which is formed into control jets by the nozzles 65 and 66 and directed against opposite sides of the power jet. The power jet passes from nozzle 62 into interaction chamber 67 defined, in part, by a pair of oppositely disposed diverging side walls 68 and 69. Due to the entrainment process, hereinbefore explained, the power jet becomes attached to one or the other side of the side walls 68 and 69. The side walls 68 and 69 diverge in the direction of flow of the power jet, thereby selectively directing the power jet to be received substantially exclusively within the corresponding one of the power flow passages 70 and 71. Illustratively, when the power jet is attached to side wall 68, the divergence thereof will effect a deflection of the power jet such that substantially all of the power fluid is received within power flow passage 70. Alternatively, the power jet may be attached initially to the side wall 69 providing a flow of power fluid in power flow passage 71. The power flow passages 70 and 71 therefore serve as receivers for the flow of power fluid in the power jet and also provide the power fluid outlets for the device 60. Due to the entrainment process, the digital fluid amplifier will have a memory function if control fluid nozzles 65 and 66 are sufficiently restricted and/or side walls 68 and 69 are sufficiently long. If the nozzles or side walls are not sufficiently restricted or long, respectively, a control jet must be maintained to keep the power jet deflected or else it becomes unstable. Memory action is not necessary in any of the digital fluid amplifiers herein described.

The digital fluid control device 60 therefore has bistable operating states, the power jet remaining attached to one or the other, but not both, of the side walls 68 and 69 following deflection thereof for creating, respectively, a flow of power fluid in either the power flow passage 70 or the power flow passage 71. To switch the power jet from a position of attachment to side wall 68, a control jet from nozzle 65 is directed against the power jet, thereby introducing control fluid between the power jet and the side wall 68. The control fluid increases the pressure of the region of trapped fluid, reducing the entrainment action and progressively detaching the power jet from side wall 68. The control jet from nozzle 65 further acts to deflect the power jet toward the opposite side wall 69 to which it becomes attached by the entrainment process. In a similar fashion, a control jet from nozzle 66 will detach the power jet from the side wall 69 and deflect it toward side wall 68, to which it will again become attached. The flow of power fluid is thereby switched in a digital fashion from one to the other of the power flow passages 70 and 71. Indentation 72, provided intermediate the power flow passages 70 and 71, enhances the deflection action by imparting a vortex action to the power fluid in the interaction chamber 67. Vents 73 and 74 serve to equalize pressure differentials acting on the power jet within the interaction chamber 67 and to remove excess fluid from the interaction chamber 67.

It will be appreciated that the digital fluid control device 60 of FIGURE 7 is inherently a square wave device and that, even upon the application of input fluid waves to the control fluid inlets 63 and 64 thereof of a sine wave form, the deflection of the power jet will create output fluid waves in the control flow passages 70 and 71 having essentially a square wave form.

In FIGURE 8 there is shown a schematic of a beat frequency detector employing digital fluid control devices 80 and 71 constituting a first stage 1″ and a digital fluid control device 82 constituting a second stage 2″. The fluid control device 80 includes first and second fluid inlets 83 and 84 to which a first input wave R and its complement $\overline{R}$, respectively, are applied. Similarly, the fluid control device 81 includes first and second control fluid inlets 85 and 86 to which the first input fluid wave R and its complement $\overline{R}$, respectively, are applied. The digital fluid control devices 80 and 81 further include power fluid inlets 87 and 88, respectively, to which a second input fluid wave B and its complement $\overline{B}$ are applied. In addition, the device 80 includes a first power fluid outlet 89 at which a flow of power fluid is produced in accordance with the logic term $(R \cdot B)$ and a second power fluid outlet 90 at which a flow of power fluid is produced in accordance with the logic term $(\overline{R} \cdot B)$. Similarly, the device 81 includes a first power fluid outlet 91 at which a flow of power fluid is produced in accordance with the logic term $(\overline{R} \cdot \overline{B})$ and a second power fluid outlet 92 at which a flow of power fluid is produced in accordance with the term $(R \cdot \overline{B})$.

The digital fluid control device 82 of stage 2″ includes first and second control fluid inlets 93 and 94, a power fluid inlet 95, and first and second power fluid outlets 96 and 97. The control fluid inlet 93 communicates at T-junction 98 and through conduits 99 and 100 with the first power fluid outlets 89 and 91, respectively, of the fluid control devices 80 and 81 to receive the flow of power fluid therefrom as a flow of control fluid in stage 2″. Similarly, control fluid inlet 94 communicates at T-junction 101 through conduits 102 and 103 with the second power fluid outlets 90 and 92, respectively, of digital fluid control devices 80 and 81 of stage 1′ to receive the flow of power fluid therefrom as a flow of control fluid in the stage 2″. Fluid flow restrictors 104, 105 and 106, 107 are provided in the conduits 99, 100 and 102, 103, respectively, to prevent the creation of deleterious back pressure effects existing upon the flow of power fluid in one, but not the other, of the two conduits having a common connection at T-junctions 98 and 101.

In the digital fluid control device 82 of stage 2″, the power jet will be switched alternately between the first and second power fluid outlets 96 and 97 thereof in response to alternate flows of control fluid at the control fluid inlets 93 or 94. Therefore, ther will be produced a flow of power fluid at power fluid outlet 96 in accordance with the logic function $(R \cdot B)+(\overline{R} \cdot \overline{B})$; similarly, there will be produced a flow of power fluid at power fluid outlet 97 in accordance with the logic function $(\overline{R} \cdot B)+(R \cdot \overline{B})$. Since the power fluid outlets 96 and 97 of the digital fluid control device 82 of stage 2″ constitute the outlet means of the fluid control system, it will be recognized that, in accordance with Equation 1, the flow of power fluid at power fluid outlet 96 constitutes the output fluid wave $P_0$ and, in accordance with Equation 2, the flow of power fluid at power fluid outlet 97 constitutes the output wave $\overline{P}_0$. The push-pull output fluid wave $\Delta P_0 = P_0 - \overline{P}_0$ approaches a sine wave as seen in FIGURE 2 (m), when filtered.

In FIGURE 9, there is shown a diagrammatic physical representation of a beat frequency detector comprising a first stage 1‴ including a half-adder fluid control device 110 and a second stage 2‴ comprising a monostable fluid control device 111. The half-adder fluid control device 110 includes first and second fluid inlets 112 and 113 terminating in nozzles 114 and 115, respectively, the nozzles 114 and 115 forming jets directed into an interaction chamber 116. The interaction chamber 116 is further defined by an arcuate wall 117, a lip member 118 and an oppositely disposed lip member 119, the lip members 118 and 119 being generally aligned with power flow passages 120 and 121, respectively.

A flow of fluid received in fluid inlet 113 is formed into a fluid jet by nozzle 115, the fluid jet proceeding through interaction chamber 116 and along the lip member 119 to be received within power flow passage 121; similarly, a flow of fluid received in fluid inlet 112 is formed into a fluid jet by nozzle 114 and directed by arcuate wall 117 to be received within power flow passage 121. When the fluid inlets 112 and 113 simultaneously receive flows of fluid, the fluid jets formed by the nozzles 114 and 115, respectively, interact in interaction chamber 116 and are directed along lip member 118 to be received within power flow passage 120. Indentation 122a provided intermediate the power flow passages 120 and 121 imparts a vortex action to the fluid flow to enhance the deflection thereof. Vents 122b and 122c communicate with interaction chamber 116 and the ambient atmosphere to reduce side pressures on the fluid jets therein and to provide passages for removing excess fluid therefrom.

The monostable fluid control device 111 of stage 2''' includes a power fluid inlet 123 terminating in a nozzle 124 for forming the power fluid into a power jet and a control flow inlet 125 terminating in nozzle 126 for forming control fluid into a control jet directed against the power jet. In the absence of a control jet, the monostable fluid control device 111 assumes a normal state in which the power jet is received in power flow passage 127; in the presence of a control jet, the power jet is switched from its normal state and deflected to create a flow of power fluid in power flow passage 128. Indentation 129 provided intermediate the power flow passages 127 and 128 imparts a vortex action to the power jet to enhance the deflection.

Conduit 130 communicates between the power flow passage 121 of the half-adder device 110 and the control fluid inlet 125 of the monostable fluid control device 111 whereby the device 111 receives, as a flow of control fluid therein, the flow of power fluid from the device 110.

The heterodyning operation of the beat frequency detector of FIGURE 9 will be seen more clearly in its equivalent schematic circuit shown in FIGURE 10. The fluid inlets 112 and 113 comprise, in effect, the first and second inlet means of the control fluid system to which the first and second input waves R and B, respectively, are applied. By reference to the wave forms of R and $\overline{R}$, shown in FIGURES 2(a) or 2(c) and 2(e), respectively, and B and $\overline{B}$, shown in FIGURES 2(b) or 2(d) and 2(f), respectively, it is apparent that the complementary waves $\overline{R}$ and $\overline{B}$ are created merely by inverting, or effecting a 180° phase shift of, the related waves R and B. Thus, the absence of a given predetermined characteristic, hereinbefore selected to be the presence of the positive cyclic portion of a given wave, is equivalently expressed to be the presence of that same predetermined characteristic in the complementary wave.

Referring now to the operation of the half-adder device 110, a flow of power fluid in power flow passage 121 exists in the presence of the predetermined characteristic, previously defined to be a positive cyclic portion, in the first input fluid wave R and the absence of that same predetermined characteristic in the second input fluid wave B, this latter being the equivalent of the presence of the predetermined characteristic in the complementary wave $\overline{B}$. A flow of power fluid also will be created in power flow passage 121 for the alternative situation constituted by the presence of the predetermined characteristic in the second input fluid wave B and the absence of that same predetermined characteristic in the first input fluid wave R or, as equivalently expressed, in the presence of that predetermined characteristic in the complementary wave $\overline{R}$. Thus, the flow of power fluid from power fluid outlet 121 may be represented by either of the logic terms ($\overline{R} \cdot B$) or ($R \cdot \overline{B}$).

Conversely, the concurrent presence of position cyclic portions in both the input fluid waves R and B creates an interaction of the fluid jets formed thereby, as hereinbefore noted, effecting a flow of power fluid at the power fluid output 120. This flow of power fluid is vented to the ambient atmosphere and rendered ineffective.

In the monostable fluid control device 111 of stage 2''', the power fluid jet will create a flow of power fluid at power fluid outlet 127 in the absence of a control jet. Since, in logic notation the presence of the control jet is represented by the logic terms ($\overline{R} \cdot B$) or ($R \cdot \overline{B}$), the absence thereof is represented by the logic terms ($R \cdot B$) and ($\overline{R} \cdot \overline{B}$). Therefore, the flow of power fluid at power fluid outlet 127 represents the logic function $$(R \cdot B) + (\overline{R} \cdot \overline{B})$$

Upon receiving a flow of control fluid at control fluid inlet 125, the power jet will be deflected and a flow of power fluid created at power fluid outlet 128. This flow of power fluid therefore may be represented by the logic function ($\overline{R} \cdot B$) + ($R \cdot \overline{B}$).

Since the power fluid outlets 127 and 128 also constitute the outlet means of the fluid control system of FIGURE 9, it will be recognized that the flow of power fluid at the power fluid outlets 127 and 128 comprise, respectively, the first and second output fluid waves $P_0$ and $\overline{P}_0$, in accordance with Equations 1 and 2, respectively.

A further embodiment of the beat frequency detector of the invention is shown in schematic form in FIGURE 11. The first stage 1'''' comprises a plurality of half-adder devices 140(a) through 140(d), and the second stage 2'''' comprises a digital fluid control device 150. The half-adder devices 140(a) through 140(d) include first fluid inlets 141(a) through 141(d), respectively, and second fluid inlets 142(a) through 142(d), respectively. They further include first power fluid outlets 143(a) through 143(d), respectively, and second power fluid outlets 144(a) through 144(d), respectively. The first power fluid outlets 143(a) through 143(d) are vented to ambient atmosphere for rendering ineffective the flows of power fluid produced thereat.

The digital fluid control device 150 of the second stage 2'''' includes first and second control fluid inlets 151 and 152, power fluid inlet 153, and first and second power fluid outlets 154 and 155. Control fluid inlet 151 communicates with the power fluid outlets 144(a) and 144(b) of the half-adder fluid control devices 140(a) and 140(b) through T-junction 156 and conduits 157(a) and 157(b), respectively; similarly, the second control inlet 152 communicates with the power fluid outlets 144(c) and 144(d) of the half-adder fluid control devices 140(c) and 140(d) through T-junction 158 and conduits 157(c) and 157(d), respectively. Fluid flow restrictors 145(a) through 145(d) are provided in the conduits 157(a) through 157(d) to prevent the creation of back pressures due to the communication of the associated conduits at the T-junctions 156 and 158.

In operation, a first input fluid wave R is applied to the first fluid inlets 141(a) and 141(d), of the half-adder devices 140(a) and 140(d), respectively, and its complement $\overline{R}$ is applied to the first fluid inlets 141(b) and 141(c) of the half-adder devices 140(b) and 140(c), respectively. A second input fluid wave B is applied to the second fluid inlets 142(a) and 142(c) of the half-adder devices 140(a) and 140(c), respectively, and its complement $\overline{B}$ is applied to the second fluid inlets 142(b) and 142(d) of the fluid control devices 140(b) and 140(d), respectively.

The creation of an output flow of power fluid at the power fluid outlets 144(a) through 144(d) requires the concurrent presence of the predetermined characteristic of positive cyclic portions of both of the input waves applied to the respective fluid inlets 141(a) through 141(d)

and 142(a) through 142(d) of the devices 140(a) through 140(d). Illustratively, with regard to the half-adder device 140(a), the flow of power fluid at the power fluid outlet 144(a) thereof may be represented by the logic term (R·B), thereby representing the concurrent presence of the predeterminned characteristic in both of the input waves R and B applied to the first and second fluid inlets 141(a) and 142(a), respectively. In similar fashion, the flow of power at the power fluid outlet 144(b) of the fluid control device 140(b) is represented by the logic term ($\overline{R}$·$\overline{B}$); at the power fluid outlet 144(c) of the device 140(c), by the logic term ($\overline{R}$·B); and at the power fluid outlet 144(d) of the device 140(d), by the logic term (R·$\overline{B}$).

The flow of power fluid from the first stage 1'''' is received as a flow of control fluid in the second stage 2''''. The power fluid jet in the fluid control device 150 will be switched in response to a control jet formed by a flow of control fluid in accordance with any single given one of the flows of power fluid from the stage 1''''. Therefore, the flow of control fluid at control fluid inlet 151 will produce a flow of power fluid at the first power fluid outlet 154 in accordance with the logic function $$(R \cdot B) + (\overline{R} \cdot \overline{B})$$

Similarly, the flow of control fluid at control fluid inlet 152 will produce a flow of power fluid at the second power fluid outlet 155 of the fluid control device 150 in accordance with the logic function ($\overline{R}$·B)+(R·$\overline{B}$). Since the first and second power fluid outlets 154 and 155 comprise the outlet means of the fluid control system of FIGURE 11, the flows of power fluid thereat comprise the first and second output waves $P_0$ and $\overline{P}_0$, respectively, in accordance with Equations 1 and 2.

The filtering means provided in FIGURE 4 may be employed to effect filtering of the output waves $P_0$ and $\overline{P}_0$ derived from any of the embodiments of the beat frequency detector disclosed herein. Thus, all of the foregoing circuits may be adapted to provide as a pressure differential output, the filtered output wave $\Delta P_0$ or its complement $\Delta \overline{P}_0$ as shown in FIGURES 1(h), 2(m), and 2(n), respectively, for analog or digital fluid control systems. The filtered output waves can be seen to approach sinusoidal wave forms and this is true for both digital and analog fluid amplifier type beat frequently detector circuits, and includes the cases of sinusoidal or square wave input fluid flows.

The fluid-operated beat frequency detectors of the invention are low in cost, both in costs of components and in manufacturing, while being highly stable in operation and of indefinite life-spans. As indicated by the numerous embodiments of the fluid-operated beat frequency detectors constructed in accordance with the invention, it is apparent that they may be readily adapted for use as in integral portion of relatively complex circuits. Through the use of readily available transducer means, they are not limited to employment with totally fluid systems, but also may be employed with electrical or mechanical systems.

It will be apparent to those skilled in the art that the fluid-operated beat frequency detectors of the invention may take various forms and embodiments other than the preferred ones specifically set out and described above. In particular, in the FIGURE 8 embodiment, power fluid outlets 90 and 92 may be omitted and the combined flow at junction 98 employed as an input to a one-input OR element, such as shown in the second stage of FIGURES 9 and 10 or alternatively, outlets 90 and 92 may be omitted and the individual flows in outlets 89 and 91 employed as two inputs to a two-input OR element. A two-input OR element is similar to a one-input OR element but having two control inputs on one side. Finally, the second stage in the FIGURES 9 and 10 embodiment may be omitted if a single sided output, rather than a push-pull output, is used in the load circuit of such amplifier. Thus, it is intended by the appended claims to cover all such modifications of the invention which fall within the true spirit and scope of the following claims.

What I claim as new and desire to secure by Letters Patent of the United States is:

1. A fluid-operated beat frequency detector comprising:
   a fluid control system including first and second stages of fluid control devices,
   said fluid control system further including inlet means communicating with said first stage and outlet means communicating with said second stage,
   means for applying to said inlet means first and second input fluid waves of first and second frequencies, respectively,
   said first stage generating a flow of power fluid controlled in accordance with the concurrent presence of predetermined characteristics in said first and second input fluid waves,
   interconnecting means for applying the controlled flow of power fluid from said first stage in accordance with a desired logic function as a flow of control fluid in said second stage,
   said second stage generating a flow of power fluid controlled in accordance with the flow of control fluid so provided in said second stage, and
   said outlet means receiving the controlled flow of power fluid from said second stage to provide output fluid waves having as frequency components the sum-frequency and difference frequency of the first and second input fluid waves.

2. A fluid-operated beat frequency detector comprising:
   a fluid control system including first and second stages of fluid control devices, said first stage being provided with fluid inlets and power fluid outlets and said second stage being provided with control fluid inlets and power fluid outlets,
   said fluid control system further including inlet means communicating with said fluid inlets of said first stage and outlet means communicating with said power fluid outlets of said second stage,
   means for applying to said inlet means of said fluid control system first and second input fluid waves of first and second frequencies, respectively,
   said first stage generating a flow of power fluid at said power fluid outlets thereof controlled in accordance with the concurrent presence of predetermined characteristics in said first and second input fluid waves,
   interconnecting means connecting the power fluid outlets of said first stage with the fluid inlets of said second stage in accordance with a desired logic function to apply the controlled flow of power fluid from said first stage as a flow of control fluid at said inlets of said second stage,
   said second stage generating a controlled flow of power fluid at said power fluid outlets thereof in accordance with the flow of control fluid applied to said inlets thereof, and
   said outlet means receiving the controlled flow of power from said power fluid outlets of said second stage to provide output fluid waves having as frequency components the sum-frequency and difference-frequency of the first and second input fluid waves.

3. A fluid-operated beat frequency detector comprising:
   a fluid control system including first and second stages of fluid control devices, each of said stages including first and second fluid inlets and first and second power fluid outlets,
   means for applying a first input fluid wave R, having a complement $\overline{R}$, of a first frequency, and a second input fluid wave B, having a complement $\overline{B}$, of a second frequency to said first and second fluid inlets, respectively, of said first stage, said first stage generating a flow of power fluid manifesting at least the logic terms $(\overline{R} \cdot B)$ and $(R \cdot \overline{B})$ in response to predetermined characteristics in the input fluid waves R and B, interconnecting means connecting said power fluid outlets of said first stage with said fluid inlets of said second stage in accordance with a predetermined logic relationship, and said second stage receiving as a flow of control fluid at one of said first and second fluid inlets thereof the flow of power fluid from said first stage in accordance with both the logic terms $(\overline{R} \cdot B)$ and $(R \cdot \overline{B})$ and generating, in response thereto, a first flow of power fluid at said first power fluid outlet of said second stage comprising a first output fluid wave manifesting the logic function $(\overline{R} \cdot B) + (R \cdot \overline{B})$ and a second flow of power fluid at said second power fluid outlet of said second stage comprising a second output fluid wave manifesting the logic function $(R \cdot B) + (\overline{R} \cdot \overline{B})$.

4. A fluid-operated beat frequency detector comprising:

a fluid control system including a first stage comprising first and second fluid control devices and a second stage comprising a third fluid control device, each of said fluid control devices including first and second control fluid inlets, a power fluid inlet, and first and second power fluid outlets, first means for applying a first square wave input fluid wave R of a first frequency and its complement $\overline{R}$ to said first and said second control fluid inlets, respectively, of both said first fluid control device and said second fluid control device, second means for applying a second square wave input fluid wave B of a second frequency and its complement $\overline{B}$ to said power fluid inlets of said first and said second fluid control devices, respectively, said first and said second fluid control devices of said first stage generating flows of power fluid at said first power fluid outlets thereof manifesting the logic terms $(R \cdot B)$ and $(\overline{R} \cdot \overline{B})$, respectively, and at said second power fluid outlets thereof manifesting the logic terms $(\overline{R} \cdot B)$ and $(R \cdot \overline{B})$, respectively, interconnecting means connecting said first power fluid outlets of said first and said second fluid control devices of said first stage with said first control fluid inlet of said third fluid control device of said second stage and connecting said second power fluid outlets of said first and said second fluid control devices of said first stage with said second control fluid inlet of said third fluid control device of said second stage, and said third fluid control device of said second stage generating a flow of power fluid at said first power fluid outlet thereof comprising a first output fluid wave manifesting the logic function $(R \cdot B) + (\overline{R} \cdot \overline{B})$ and generating a flow of power fluid at said second power fluid outlet thereof comprising a second output fluid wave manifesting the logic function $(\overline{R} \cdot B) + (R \cdot \overline{B})$.

5. A fluid-operated beat frequency detector comprising:

a fluid control system including a first stage comprising a first fluid control device having first and second fluid inlets and a power fluid outlet and a second stage comprising a second fluid control device having a control fluid inlet, a power fluid inlet, and first and second power fluid outlets, first means for applying a first input fluid wave R, having a complement $\overline{R}$, of a first frequency to said first fluid inlet and second means for applying a second input fluid wave B, having a complement $\overline{B}$, of a second frequency to said second fluid inlet of said first fluid control device of said first stage, said first fluid control device of said first stage generating a flow of power fluid at said power fluid outlet thereof manifesting the logic terms $(\overline{R} \cdot B)$ and $(R \cdot \overline{B})$, interconnecting means connecting said power fluid outlet of said fluid control device of said first stage with said control fluid inlet of said fluid control device of said second stage, and said fluid control device of said second stage generating a flow of power fluid at said first power fluid outlet thereof manifesting the logic function $(R \cdot B) + (\overline{R} \cdot \overline{B})$ and generating a second flow of power fluid at said second power fluid outlet manifesting the logic function $(\overline{R} \cdot B) + (R \cdot \overline{B})$.

6. A fluid-operated beat frequency detector comprising:

a fluid control system including a first stage comprising first, second, third, and fourth fluid control devices each including first and second fluid inlets and a power fluid outlet and a second stage comprising a fifth fluid control device having first and second control fluid inlets, a power fluid inlet, and first and second power fluid outlets, first means for applying a first input wave R of a first frequency to said first fluid inlets of said first and said fourth fluid control devices of said first stage and for applying the complement $\overline{R}$ thereof to said first fluid inlets of said second and third fluid control devices of said first stage, second means for applying a second input wave B of a second frequency to said second fluid inlets of said first and third fluid control devices of said first stage and for applying the complement $\overline{B}$ thereof to said second fluid inlets of said second and fourth fluid control devices of said first stage, said first, second, third, and fourth fluid control devices of said first stage performing a logic AND function upon the associated input fluid waves respectively applied to the first and second fluid inlets thereof to provide a flow of power fluid at the power fluid outlets thereof manifesting the logic terms, respectively, $(R \cdot B)$, $(\overline{R} \cdot \overline{B})$, $(\overline{R} \cdot B)$, $(R \cdot \overline{B})$, interconnecting means connecting said power fluid outlets of said first and second fluid control devices of said first stage with said first control fluid inlet of said fifth fluid control device of said second stage and connecting said power fluid outlets of said third and fourth fluid control devices of said first stage with said second control fluid inlet of said fifth fluid control device of said second stage, and said fifth fluid control device of said second stage receiving as a flow of control fluid therein the flow of power fluid from said first stage and generating a first flow of power fluid at said first power fluid outlet of said second stage comprising a first output fluid wave manifesting the logic function $(R \cdot B + (\overline{R} \cdot \overline{B})$ and generating a flow of power fluid at said second power fluid outlet of said second stage comprising a second output fluid wave manifesting the logic functions $(\overline{R} \cdot B) + (R \cdot \overline{B})$.

7. A fluid-operated beat frequency detector comprising:

a fluid control system including a first stage comprising first and second fluid amplifiers and a second stage comprising a fluid amplifier, each of said fluid amplifiers including a power fluid inlet, first and second control fluid inlets, and first and second power fluid outlets, first means for applying a first input fluid wave to the first control fluid inlets and the complement of the first input fluid wave to the second control fluid inlets of both said first and said second fluid amplifiers of said first stage, second means for applying a second input fluid wave and the complement of said second input fluid wave to said power fluid inlets of said first and said second fluid control devices, respectively, of said first stage, said first and said second fluid amplifiers providing a first flow of power fluid at said first power fluid outlets thereof in response to the concurrent presence of predetermined characteristics in the input waves R and B and the input waves $\overline{R}$ and $\overline{B}$, respectively, applied thereto, and providing a second flow of power fluid at said second power fluid outlets thereof in response to the concurrent presence of predetermined characteristics in the input waves $\overline{R}$ and B and the input waves R and $\overline{B}$, respectively, applied thereto, first and second conduit means communicating between said first power fluid outlets of said first and second fluid amplifiers of said first stage and said first control fluid inlet of said fluid amplifier of said second stage to apply the first flow of power fluid from said first stage as a first flow of control fluid to said second stage, third and fourth conduit means communicating between said second power fluid outlets of said first and second fluid amplifiers of said first stage and said second control fluid inlet of said fluid amplifier of said second stage to apply the second flow of power fluid from said first stage as a second flow of control fluid to said second stage, and said fluid amplifier of said second stage responding to the first and second flows of control fluid received therein to produce first and second flows of power fluid at said first and second power fluid outlets thereof comprising first and second output fluid waves in a push-pull relationship having as frequency components the sum-frequency and difference-frequency of the first and second input fluid waves.

8. A fluid-operated beat frequency detector as recited in claim 7 wherein there are further provided first and second filter means respectively communicating with said first and second power fluid outlets of said fluid control device of said second stage for filtering the sum-frequency component from the first and second output fluid waves to provide push-pull output fluid waves having as a frequency component the difference-frequency of the first and second input fluid waves.

9. A fluid-operated beat frequency detector as recited in claim 7 wherein each of said fluid amplifiers comprises an analog fluid amplifier.

10. A fluid-operated beat frequency detector as recited in claim 7 wherein each of said fluid amplifiers comprises a digital fluid amplifier.

11. A fluid-operated beat frequency detector as recited in claim 7 wherein said first control fluid inlet of said fluid amplifier of said second stage includes first and second control flow passages respectively communicating with said first and said second conduit means and wherein said second control fluid inlet of said fluid amplifier of said second stage includes third and fourth control flow passages respectively communicating with said third and said fourth conduit means.

12. A fluid-operated beat frequency detector as recited in claim 7 wherein there is further provided:
a first T-junction communicating with said first and second conduit means to combine the first flow of power fluid from said first and second fluid amplifiers of said first stage as a single flow of control fluid at said first control fluid inlet of said fluid amplifier of said second stage,
a second T-junction communicating with said third and fourth conduit means to combine the second flow of power fluid from said first and second fluid amplifiers of said first stage as a single flow of control fluid at said second control fluid inlet of said fluid amplifier of said second stage, and
fluid flow restrictor means in each of said first, said second, said third, and said fourth conduit means to prevent the creation of back pressures in the respectively associated conduit means.

13. A fluid-operated beat frequency detector comprising:
a fluid control half-adder device including first and second fluid inlets and first and second power fluid outlets,
a monostable fluid control device including a control fluid inlet, a power fluid inlet, and first and second power fluid outlets,
means for applying first and second input fluid waves to said first and second fluid inlets, respectively, of said fluid control half-adder device,
said fluid control half-adder device providing a first flow of power fluid at said first power fluid outlet thereof in response to the mutually exclusive presence of a predetermined characteristic in each of the first and second input fluid waves and providing a second flow of output power fluid at said second power fluid outlet thereof in response to the concurrent presence of the same predetermined characteristic in each of the first and second input fluid waves,
conduit means communicating between said first power fluid outlet of said half-adder device and said control fluid inlet of said monostable fluid amplifier device to apply the first flow of power fluid from said fluid control half-adder device as a flow of control fluid to said control fluid inlet of said monostable fluid amplifier device,
said monostable fluid amplifier device operating, as a normal state, in the absence of a flow of control fluid at said control fluid inlet thereof to provide a first flow of power fluid at said first power fluid outlet and operating in response to the flow of control fluid therein to provide a second flow of power fluid at said second power fluid outlet, and
the first and second flows of power fluid at said first and second power fluid outlets of said monostable fluid amplifier device comprising push-pull output fluid waves having as frequency components thereof, the sum-frequency and difference-frequency of the first and second input fluid waves.

14. A fluid-operated beat frequency detector as recited in claim 13 wherein there are further provided first and second fluid filter means respectively communicating with said first and said second power fluid outlets of said monostable fluid amplifier device for filtering the sum-frequency component from the first and second output fluid waves to provide push-pull output fluid waves having as a frequency component the difference-frequency of the first and second input fluid waves.

15. A fluid-operated beat frequency detector comprising:
first, second, third, and fourth half-adder devices, each of said devices including first and second fluid inlets and first and second power fluid outlets,
a fluid amplifier device including first and second control fluid inlets, a power fluid inlet, and first and second power fluid outlets,
first means for applying a first input fluid wave to said first and fourth half-adder devices and for applying the complement of said first input fluid wave to said second and third half-adder devices,
second means for applying a second input fluid wave to said first and third half-adder devices and for applying the complement of said second input fluid wave to said second and fourth half-adder devices,
each of said half-adder devices responding to the mutually exclusive presence of predetermined characteristics in each of the input fluid waves applied thereto to provide an output flow of power fluid at said first power fluid outlets thereof and responding to the concurrent presence of the same predetermined characteristics in each of said input fluid waves to provide a flow of power fluid at said second power fluid outlets thereof, first and second conduit means connecting said second power fluid outlets of said first and second half-adder devices with said first control fluid inlet of said fluid amplifier to apply thereto the flow of power fluid from each of said first and second half-adder devices as a first flow of control fluid, and third and fourth conduit means connecting said second power fluid outlets of said third and fourth half-adder devices with said second control fluid inlet of said fluid amplifier to apply thereto the flow of power fluid from said third and fourth half-adder devices as a second flow of control fluid, said fluid amplifier device responding to said first flow of control fluid to provide a first flow of power fluid at said first power fluid outlet thereof and responding to said second flow of control fluid to provide a second flow of power fluid at said second power fluid outlet thereof, and said first and second flows of power fluid at said first and second power fluid outlets of said fluid amplifier device comprising push-pull output fluid waves having as frequency components the sum-frequency and difference-frequency of the first and second input fluid waves.

16. A fluid-operated beat frequency detector as recited in claim 15 wherein there is further provided:

a first T-junction communicating between said first and said second conduit means and said first control fluid inlet of said fluid amplifier device to combine the second flows of power fluid from said first and said second half-adder devices as the first flow of control fluid, a second T-junction communicating between said third and said fourth conduit means and said second control fluid inlet of said fluid amplifier device to combine the second flows of power fluid from said third and fourth half-adder devices as the second flow of control fluid, and fluid flow restrictor means in each of said first, second, third, and fourth conduit means to prevent the creation of back pressures in the respectively associated conduit means.

17. A fluid-operated beat frequency detector as recited in claim 15 wherein there is further provided first and second fluid filter means respectively communicating with said first and second power fluid outlets of said fluid amplifier device for filtering the sum-frequency component from the first and second output fluid waves to provide push-pull output fluid waves having as a frequency component the difference-frequency of the first and second input fluid waves,

18. A fluid-operated beat frequency detector comprising:

a half-adder fluid amplifier device, said device including first and second fluid inlets terminating in first and second nozzles, respectively, an interaction chamber adjacent the origin of a first and second fluid jet generated by said first and second fluid inlets, said interaction chamber defined by a pair of side walls, a first of said side walls having a curved surface and a lip member, fluid receiving means downstream from said side walls for selectively receiving fluid from a fluid jet attached to a side wall of said chamber, said half-adder device providing a flow of fluid at a first of said fluid receiving means in response to the alternate presence of two fluid inputs R and B applied to said first and second fluid inlets, respectively, said flow at the first fluid receiving means manifesting the logic terms $(R \cdot \overline{B})$ and $(\overline{R} \cdot B)$ whereby a single-sided output fluid wave is obtained having as frequency components the sum-frequency and difference-frequency of the first and second input waves R and B, and means in communication with said first fluid receiving means for providing a push-pull output fluid wave manifesting the logic functions $(R \cdot \overline{B}) + (\overline{R} \cdot B)$ and $(R \cdot B) + (\overline{R} \cdot \overline{B})$ having as frequency components the sum-frequency and difference-frequency of the first and second input waves R and B.

References Cited by the Examiner

UNITED STATES PATENTS

| 3,117,593 | 1/1964 | Sowers | 137—81.5 XR |
| 3,193,197 | 7/1965 | Bauer | 137—81.5 XR |
| 3,204,405 | 8/1965 | Warren et al. | 137—81.5 XR |

FOREIGN PATENTS 1,278,781  11/1961  France.

OTHER REFERENCES

H. D. L. Report: Fluid Amplification, Logic Elements #9, E.V. Hobbs, March 8, 1963, pp. 20, 21 and 22, Figures 12, 13 and 14. (Copy in Science Library).

I.B.M. Technical Disclosure Bulletin, "Fluid Logic Shift Register with Intermediate Stages," H. R. Grubb, vol. 6, No. 1, June 1963, pp. 24, 25. (Copy in Group 360, 137—81.5 and Science Library).

M. CARY NELSON, *Primary Examiner.*

S. SCOTT, *Assistant Examiner,*